United States Patent [19]
Buell

[11] Patent Number: 6,043,610
[45] Date of Patent: Mar. 28, 2000

[54] BATTERY OPERATED POWER SUPPLY INCLUDING A LOW LEVEL BOOST AND A HIGH LEVEL BOOST

[75] Inventor: Brian Jeffrey Buell, Chandler, Ariz.

[73] Assignee: Durel Corporation, Chandler, Ariz.

[21] Appl. No.: 09/116,363

[22] Filed: Jul. 16, 1998

[51] Int. Cl.[7] .................................................. H05B 37/02
[52] U.S. Cl. ...................... 315/169.3; 315/205; 315/224; 363/60
[58] Field of Search .................... 315/169.3, 205, 315/224; 363/59, 60

[56] References Cited

U.S. PATENT DOCUMENTS

| 5,047,690 | 9/1991 | Nilssen | 315/224 |
| 5,306,954 | 4/1994 | Chan et al. | 307/110 |
| 5,313,141 | 5/1994 | Kimball | 315/169.3 |
| 5,493,543 | 2/1996 | Kamens | 368/225 |
| 5,566,064 | 10/1996 | Schoenwald et al. | 315/169.3 |
| 5,747,941 | 5/1998 | Shackle et al. | 315/224 |

OTHER PUBLICATIONS

Advertisement by Sipex Corporation dated Mar., 1997, showing EL driver SP4430.

Primary Examiner—Michael B Shingleton
Attorney, Agent, or Firm—Paul F. Wille

[57] ABSTRACT

An EL lamp is driven by a power supply including a voltage boost circuit and a low power inverter. The boost circuit includes a level shifting capacitor to provide voltage doubling. The inverter includes an inductor and at least one transistor connected in series between the output of the boost circuit and ground.

11 Claims, 2 Drawing Sheets

| Inverter | Boost (Y/N) | Voltage Volts | Current (ma.) | Inductance L(mh) | Brightness (ft-L) | lamp area sq. in. | F.O.M. |
|---|---|---|---|---|---|---|---|
| 1 | a | N | 3.3 | 30 | 1.5 | 1.75 | 17.7 | 313 |
| 2 | a | Y | 3.3 | 68 | 2.7 | 4.0 | 17.7 | 316 |
| 3 | A | N | 3.3 | 75 | 0.5 | 2.9 | 17.7 | 207 |
| 4 | b | Y | 3.3 | 62 | 5.6 | 3.3 | 17.7 | 285 |
| 5 | B | N | 3.3 | 63 | 1.8 | 3.3 | 17.7 | 281 |
| 6 | a | Y | 5.0 | 85 | 3.3 | 7.2 | 17.7 | 300 |
| 7 | A | N | 5.0 | 69 | 1.0 | 4.4 | 17.7 | 226 |
| 8 | A | N | 5.0 | 90 | 0.7 | 5.55 | 17.7 | 218 |
| 9 | b | Y | 5.0 | 64 | 12.0 | 5.65 | 17.7 | 313 |
| 10 | B | N | 5.0 | 68 | 3.9 | 4.9 | 17.7 | 255 |

FIG. 3

BATTERY OPERATED POWER SUPPLY INCLUDING A LOW LEVEL BOOST AND A HIGH LEVEL BOOST

BACKGROUND OF THE INVENTION

This invention relates to a battery operated power supply for an electroluminescent (EL) lamp and, in particular, to the combination of a voltage boost driving an inverter for powering an EL lamp.

An EL lamp is essentially a capacitor having a dielectric layer between two conductive electrodes, one of which is transparent. The dielectric layer may include a phosphor powder or there may be a separate layer of phosphor powder adjacent the dielectric layer. The phosphor powder radiates light in the presence of a strong electric field, using very little current. Because an EL lamp is a capacitor, alternating current must be applied to the electrodes to cause the phosphor to glow, otherwise the capacitor charges to the applied voltage, the current through the EL lamp ceases, and the lamp stops producing light.

In portable electronic devices, automotive displays, and other applications where the power source is a low voltage battery, an EL lamp is powered by an inverter that converts direct current into alternating current. In order for an EL lamp to glow sufficiently, a peak-to-peak voltage in excess of about one hundred and twenty volts is necessary. The actual voltage depends on the construction of the lamp and, in particular, the field strength within the phosphor powder. The frequency of the alternating current through an EL lamp affects the life of the EL lamp, with frequencies between 200 hertz and 1000 hertz being preferred. Ionic migration occurs in She phosphor at frequencies below 200 hertz. Above 1000 hertz, the life of the phosphor is inversely proportional to frequency.

The prior art discloses using any one of several types of inverters in which the energy stored in an inductor is supplied to an EL lamp as a small current at high voltage. The voltage on the lamp is pumped up by a series of pulses from the inverter. The direct current produced by inverter must be converted into an alternating current in order to power an EL lamp. U.S. Pat. No. 4,527,096 (Kindlmann) discloses a switching bridge for this purpose. U.S. Pat. No. 5,313,117 (Kimball) discloses an alternative design that produces an AC voltage directly.

A typical EL lamp draws approximately one milliampere of current per square inch of light emitting surface at full brightness. In the prior art, most of the applications for EL lamps required a lamp having an area of one to three square inches. There are many applications for EL lamps in which the area of the lamp exceeds five square inches and existing power supplies are not very efficient, in terms of luminance per watt, at providing sufficient power for an EL lamp; i.e. providing the same luminance at the same efficiency as smaller inverters.

Larger inverters, that is, inverters producing higher voltage, greater current, or both, tend to be less efficient because of greater switching losses. Typically, a higher input voltage to an inverter causes an EL lamp to produce more light. Any power conversion circuit imposes a loss and adding a boost ahead of an inverter would not be expected to be more efficient than the inverter alone because of the loss, typically ten to fifteen percent, in the boost.

A high power inverter for EL lamps uses transistors that can conduct larger current, which increases the size of the semiconductor die and, therefore, the cost of the inverter. Preferably, the cost of a boost and a low power inverter is less than the cost of a high power inverter alone.

In view of the foregoing, it is therefore an object of the invention to provide an efficient inverter for powering large area lamps, e.g. lamps having an area greater than five square inches.

Another object of the invention is to provide a power supply for operating large area lamps with less power than in the prior art.

A further object of the invention is to provide a power supply for powering large area lamps that is more cost effective than inverters of the prior art.

SUMMARY OF THE INVENTION

The foregoing objects are achieved in the invention in which an EL lamp is driven by a power supply including a voltage boost and a low power inverter. Unexpectedly, the combination of a low power inverter and a voltage boost is more efficient than a larger inverter operated directly from a battery.

BRIEF DESCRIPTION OF THE DRAWINGS

A more complete understanding of the invention can be obtained by considering the following detailed description in conjunction with the accompanying drawings, in which:

FIG. 3 is a chart comparing inverters operated with a voltage boost to a higher power inverter operated without a voltage boost.

DETAILED DESCRIPTION OF THE INVENTION

Figure 1:
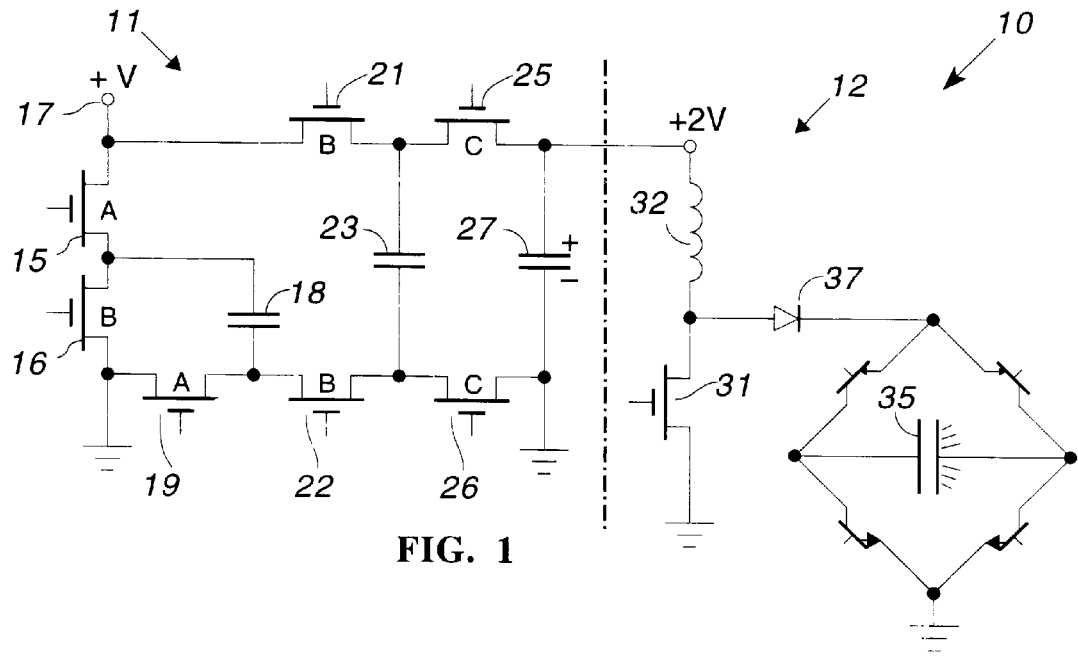
FIG. 1 is a schematic diagram of a power supply constructed in accordance with one aspect of the invention.

In FIG. 1, power supply 10 includes capacitive voltage boost 11 and inverter 12. In operation, one has the output of a first boost circuit coupled to the input of a second boost circuit. Voltage boost 11 uses level shifting to produce a voltage on storage capacitor 27 that is twice the supply voltage, in the manner disclosed in U.S. Pat. No. 5,306,954 (Chan et al.). Specifically, transistors 15 and 16 are connected in series between supply 17 and ground or common. Capacitor 18 and transistor 19 are connected in series between the junction of transistors 15 and 16 and ground. Transistors 16, 19, and 22, in effect, reverse the polarity of capacitor 18 to provide level shifting. Transistors 21 and 22 isolate capacitor 23 from the components described thus far and transistors 25 and 26 isolate storage capacitor 27 from capacitor 23.

Transistors 15, 16, 19, 21, 22, 25 and 26 are labeled with a letter to indicate the sequence in which the transistors are made conducting. Transistors 15 and 19 are turned on initially to charge capacitor 18 to +V volts, the voltage of supply 17. Transistors 15 and 19 turn off and then transistors 16, 21, and 22 turn on. Transistor 16 connects the positively charged side of capacitor 18 to ground, which shifts the voltage at the junction of transistors 19 and 22 to −V volts. With transistors 21 and 22 conducting, capacitor 23 charges and the voltage across capacitor 23 becomes 2V centered about ground potential.

Transistors 16, 21, and 22 turn off, isolating capacitor 23 and then transistors 25 and 26 turn on, transferring the voltage to storage capacitor 27. Because one side of storage capacitor 27 is grounded, the otherside of the capacitor is +2V above ground and the level shifting is completed.

Inverter 12 combines an inductive boost circuit with a bridge output, wherein the bridge acts as a double-pole, double-throw switch for converting DC to AC, in the manner disclosed in U.S. Pat. No. 4,527,096 (Kindlmann). When transistor 31 turns on, current flows through inductor 32, storing energy in the magnetic field generated by the inductor. When transistor 31 shuts off, the magnetic field collapses at a rate determined by the turn-off characteristics of transistor 31. The voltage across inductor 32 is proportional to the rate at which the field collapses ($\delta i/\delta t$). Thus, a low voltage and large current is converted into a high voltage at a small current.

The current pulses are coupled through diode 37 to the DC diagonal of a switching bridge having EL lamp 35 connected across the AC diagonal. The same amount of energy is supplied to lamp 35 each time that transistor 31 turns off and, therefore, the voltage on the lamp is pumped up by a series of current pulses from inductor 32 as transistor 31 repeatedly turns on and off. Diode 37 prevents lamp 35 from discharging through transistor 31.

If transistor 31 were switched on and off continuously, the pulses would charge lamp 35 to the maximum voltage available from inductor 32, e.g. about 310 volts. Because an EL lamp needs an alternating current or a variable direct current, the lamp would glow initially and then extinguish when the capacitance of the lamp became fully charged. To avoid this problem, the transistors in opposite sides of the bridge alternately conduct to reverse the connections to lamp 35. The bridge transistors switch at a lower frequency than the frequency at which transistor 31 switches.

Figure 2:
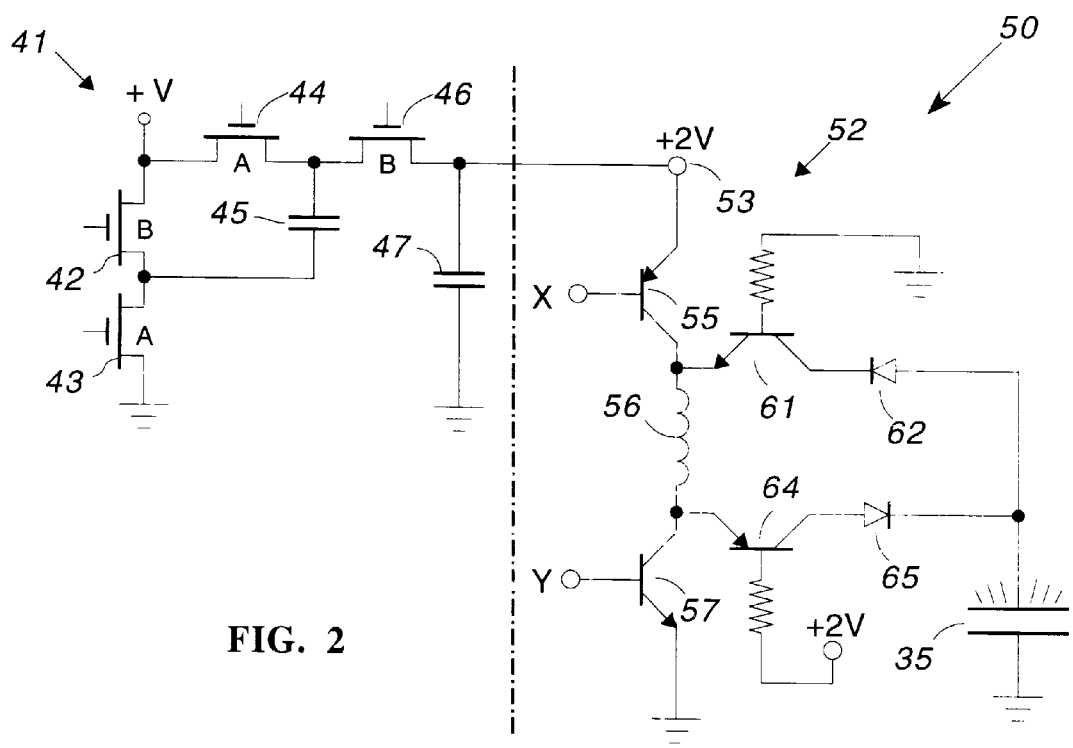
FIG. 2 is a schematic diagram of a power supply constructed in accordance with a preferred embodiment of the invention.

In FIG. 2, power supply 50 includes capacitive voltage boost 41 and inverter 52. Voltage boost 41 is essentially the same circuit as found in LM2665 voltage doubler as sold by National Semiconductor, and provides a voltage of +2V at terminal 53. Inverter 52 alternately switches opposite ends of an inductor to provide a boost circuit with an AC output, in the manner described in U.S. Pat. No. 5,313,141 (Kimball).

In boost circuit 41, transistors 42 and 43 are coupled in series between supply and ground. Transistor 44 and capacitor 45 are coupled in series between supply and the junction of transistors 42 and 43. Transistor 46 and capacitor 47 are coupled in series between ground and the junction of transistor 44 and capacitor 45. The transistors are labeled with a letter to indicate the order in which the transistors conduct.

Transistors 43 and 44 conduct simultaneously to charge capacitor 45 to V volts and then shut off. Transistors 42 and 46 conduct simultaneously to reverse the polarity of capacitor 45 and to couple the capacitor in series between supply and capacitor 47, thereby charging capacitor 47 to +2V. The voltage at terminal 53 may be slightly less than +2V, depending upon the amount of current drawn by inverter 52.

Inverter 52 includes transistor 55, inductor 56, and transistor 57 connected in series between terminal 53 and ground. Inductor 56 is alternately connected through transistors 61 and 64 to lamp 35. Diode 62 is connected in series with transistor 61 for preventing the transistor from operating in the inverse active mode, i.e. preventing transistor 61 from conducting current from the ground terminal through the forward bias base-collector junction when the voltage on lamp 35 is negative. Similarly, diode 65 prevents transistor 64 from operating in the inverse active mode when the voltage on lamp 35 is positive and greater than +2V.

External logic circuitry provides a series of pulse bursts alternately on output lines "X" and "Y". Specifically, while transistor 55 is conducting, transistor 57 is pulsed and inverter 52 operates essentially the same as inverter 12 (FIG. 1), pumping positive charge into lamp 35. After a predetermined time, the operation is reversed and transistor 55 is pulsed while transistor 57 remains conducting. This pumps negative charge into lamp 35. The operation reverses at a lower frequency than the pumping frequency, thereby providing positive and negative half cycles of low frequency AC to lamp 35.

The conversion efficiency of any power supply is never one hundred percent. One would assume that adding a voltage boost to an inverter would necessarily be less efficient than an inverter alone. However, it has been discovered that adding a capacitive voltage boost to an inverter can increase the efficiency of the system in terms of light output per watt input. FIG. 3 is a table of data comparing high power inverters (represented by an uppercase letter) with the combination of a voltage boost and a low power inverter (represented by a lowercase letter). Tests 4, 5, 9, and 10 used a different pair of inverters from the other tests. "F.O.M." represents "figure of merit" and is calculated as the brightness in foot-lamberts times the area of the lamp divided by input power measured in watts.

For tests #1, 2, 3, 6, 7, 8, "inductance" is the inductance of inductor 56 (FIG. 2). For tests #4, 5, 9, 10, "inductance" is the inductance of inductor 32 (FIG. 1). As indicated in test #1, a low power inverter has a good figure of merit but a large area lamp is not very bright. As indicated by test #2, adding a voltage boost not only greatly increased brightness but increased the figure of merit also. Tests #6–10 indicate that increased supply voltage increases brightness. Even so, the combination of voltage boost and low power inverter is brighter and more efficient than a high power inverter.

Test #8 indicates that adjusting the value of the inductor can improve brightness but the figure of merit declines and, even with adjustment, the brightness does not equal the brightness obtained from the combination of a boost circuit and a low power inverter (test #6). It may seem that large inductances were used only for tests with a voltage boost. This is true but one must keep in mind that the inductors had to be changed because of the higher voltage supplied to the inverter. Commercially available semiconductors were used for the tests. The inductances were chosen from standard values as appropriate to keep power dissipation within the limits defined in the data sheets supplied by the manufacturers of the inverters.

Except for tests #4,5, the combination of a voltage boost and a low power inverter had a significantly better figure of merit than a high power inverter alone. Even in test #4, the figure of merit was slightly higher than test #5. The invention thus provides an efficient power supply for powering large area lamps from a low current inverter. In particular, the invention enables one to operate large area lamps with less power than in the prior art.

Having thus described the invention, it will be apparent to those of skill in the art that many modifications can be made with the scope of the invention. For example, although described in the context of large area lamps, the invention can be used with small area lamps. The tests summarized in FIG. 3 utilized commercially available devices. The invention can be implemented as a single integrated circuit. The particular boost circuits shown in FIGS. 1 and 2 can be interchanged or other boost circuits can be used. Inductive boosts could be used but are less desirable for EL applications because of the cost and the size of the additional inductor. The invention is not restricted to voltage doublers; triplers or quadruplers can be used instead.

What is claimed as the invention is:

1. A power supply for an electroluminescent lamp, said power supply comprising:
   a first voltage boost circuit having an output;
   a second voltage boost circuit having an input coupled to the output of the first voltage boost circuit;
   wherein the second boost circuit has an output adapted to power an EL lamp.

2. The power supply as set forth in claim 1 wherein said second boost circuit includes:
   an inductor;
   a first switching transistor connected in series with said inductor between said output and ground.

3. The power supply as set forth in claim 2 wherein said second boost circuit further includes a second switching transistor connected in series with said inductor such that the inductor is between the first switching transistor and the second switching transistor.

4. The power supply as set forth in claim 1 wherein said first voltage boost circuit includes a level shifting capacitor.

5. The power supply as set forth in claim 4 wherein said second boost circuit includes:
   an inductor;
   a first switching transistor connected in series with said inductor between said output and ground.

6. The power supply as set forth in claim 5 wherein said second boost circuit further includes a second switching transistor connected in series with said inductor such that the inductor is between the first switching transistor and the second switching transistor.

7. The power supply as set forth in claim 1 wherein said first voltage boost circuit is a voltage doubler.

8. A power supply for an electroluminescent lamp, said power supply comprising:
   an inverter;
   a capacitive voltage boost circuit having an output coupled only to said inverter.

9. The power supply as set forth in claim 8 wherein said inverter includes:
   an inductor;
   a first switching transistor connected in series with said inductor between said output and ground.

10. The power supply as set forth in claim 9 wherein said inverter further includes a second switching transistor connected in series with said inductor such that the inductor is between the first switching transistor and the second switching transistor.

11. The power supply as set forth in claim 8 wherein said capacitive voltage boost circuit includes a level shifting capacitor.

* * * * *